Oct. 20, 1959
K. L. JOHNSON
2,909,206
WELD NUT WITH INWARDLY SLOPING FLASH POCKETS
Filed March 10, 1950
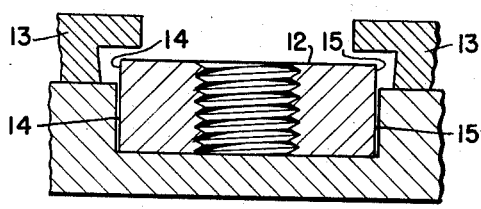
Fig. 5
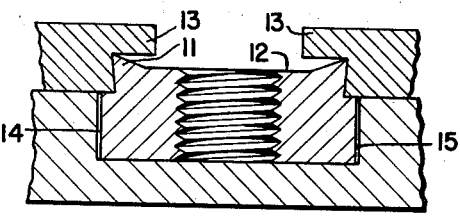
Fig. 6
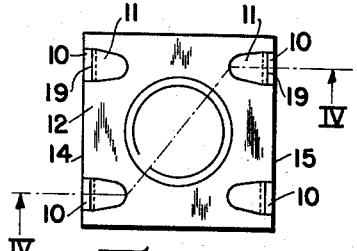
Fig. 2
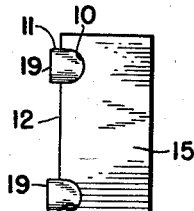
Fig. 3
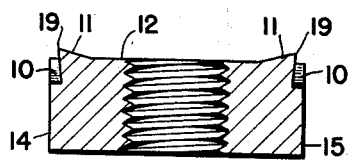
Fig. 4
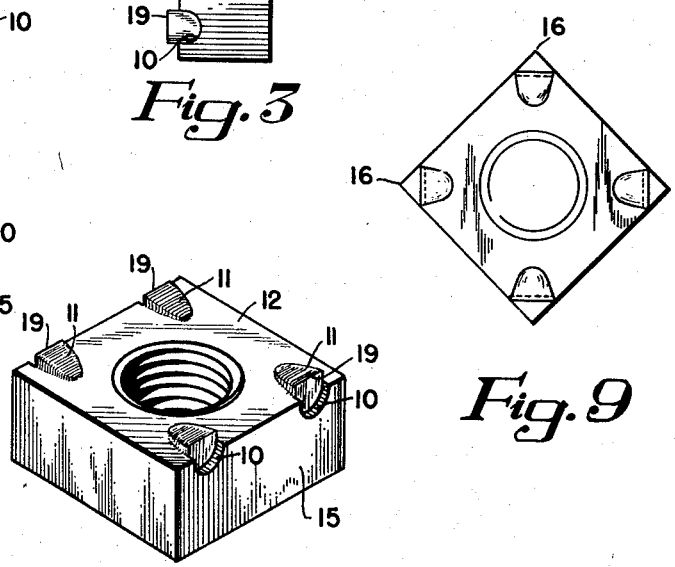
Fig. 9
Fig. 1
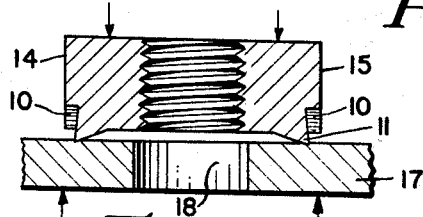
Fig. 7
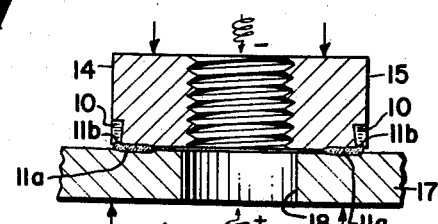
Fig. 8
INVENTOR.
Kenneth L. Johnson
BY
FOR Green, McCallister & Miller
HIS ATTORNEYS

United States Patent Office 2,909,206
Patented Oct. 20, 1959

2,909,206

WELD NUT WITH INWARDLY SLOPING FLASH POCKETS

Kenneth L. Johnson, Edinboro, Pa.

Application March 10, 1950, Serial No. 148,835

3 Claims. (Cl. 151—41.7)

This invention relates to fasteners and more particularly to fastener members provided with a threaded bore and having spaced welding projections extending outwardly from one of the faces thereof which in the main is perpendicular to the axis of such bore. Such fastener members are commonly called weld nuts and such welding projections are adapted to be fusion welded to a sheet or plate-like support member.

Weld nuts are used in assemblies which have one or more inaccessible sides or where it is cheaper to use this type of fastener member than to use ordinary nuts in the conventional way.

Weld nuts are called welding nuts in Demboski et al. U.S. Patent 2,105,139 and grommets in Almdale U.S. Patent 2,054,189 and Smith U.S. Patent 2,167,285.

The Demboski et al. welding nuts are produced from specially rolled bar stock having spaced, parallel longitudinally extending ribs on one of its wide faces, and in order to form the welding projections for a nut blank from such bar stock, Demboski et al. displaces all of the metal of such ribs on such blank, except that which is allowed to remain, to form such welding projections.

All of the grommet forms of the Almdale and Smith patents require special forming procedures and cannot be readily produced from standard nut blanks nor from standard nuts.

One object of this invention is to produce a new and improved weld nut.

Another object is to provide a method whereby standard nuts may be readily converted into improved weld nuts.

Another object is to produce a weld nut provided with spaced welding projections extending outwardly from one face thereof, with a relief or flash pocket between each such projection and the immediately adjacent side or corner of such weld nut.

A still further object is to provide a method of readily converting standard nuts into improved weld nuts having welding projections thereon and a flash or relief pocket immediately adjacent each such projection and between it and the adjacent side or corner of such nut.

These and other objects, which will be readily apparent to those skilled in this particular art, I attain by means of the structures described in the specification and illustrated in the drawings accompanying and forming part of this application.

In the drawings:

Figure 1 is a perspective view of a weld nut embodying this invention;

Fig. 2 is a top plan view of the nut of Fig. 1;

Fig. 3 is a view looking toward the nut of Fig. 2 from the left-hand side thereof;

Fig. 4 is a sectional view of the nut of Fig. 2 from the left-hand side thereof;

Fig. 5 is a more or less diagrammatic vertical section through a suitable tool for making a weld nut in accordance with this invention; the nut within the tool is shown in section and such section is taken on line IV—IV of Fig. 2 prior to the formation of the welding projections and the relief pockets;

Fig. 6 is a section similar to Fig. 5 and discloses the punch elements in the final position taken in forming the weld projections and relief pockets in accordance with this invention; the nut in this view is also taken on line IV—IV of Fig. 2;

Figs. 7 and 8 are somewhat diagrammatic views in section similar to the section of Fig. 4 and illustrate the procedure of securing the weld nut of this invention to a sheet or plate-like metal support member; and Fig. 9 is a top plan view of a modified form of weld nut constructed in accordance with this invention.

The weld nut of this invention is characterized by having relief or flash pockets or indentations open to the face from which its welding projections extend; one such pocket being located at the base of each welding projection and between such base and the immediately adjacent side edge or corner of the weld nut as clearly shown in the drawings, particularly Figs. 1 and 9.

The relief or flash pockets which in Figures 1, 2, 4, 7 and 8 are numbered 10, are formed incident to the striking up of the welding projections 11 from face 12 which may be referred to as the welding face or surface of the nut since it is provided with the welding projections.

This weld nut is adapted to rapid automatic manufacture in a simple die (Figs. 5 and 6) wherein punches or upsetting tools 13 close inwardly on the upper edge portion of opposed side faces 14 and 15 of the nut in such manner that welding projections 11 are struck up ahead of such punches.

The projections 11 thus formed are by free unhampered flow of the metal and their contour is governed both by the shape of punches 13 and their depth of penetration into the body of the nut past side faces 14 and 15 or past the corners 16 as in Fig. 6.

I have found that it is desirable to have a front rake of about five degrees on the forward face of each punch or upsetting tool, since it facilitates the smooth flow of metal ahead of the same, prolongs the life of the punches and causes each welding projection to slightly overhang its adjacent pocket.

This overhang is very effective in promoting flow of the heated metal of the welding projections away from the nut bore and into the flash pockets, cavities or indentations when a nut is being applied to a support member as disclosed in Figs. 7 and 8.

In Fig. 7, welding projections 11 are shown in contact with support member 17 provided with an opening 18 with which the bore of the nut is to be aligned. Due to the fact that the welding projections have a relatively sharp edge 19 and are harder than the nut body, due to the cold working by which they are formed, the opposed pressures applied to the support member and the nut tend to slightly sink such sharp edges 19 into the support member as indicated in Fig. 7. This takes place immediately prior to the time the welding current is turned on.

Current of opposite potential is applied simultaneously to the weld nut and the support member 17 as disclosed in Figure 8 to effect fusion welding of the welding projections 11 to the support member. The welding projections due to heat and pressure, assume more or less the form shown at 11a, Fig. 8, and the pockets or cavities 10 receive the flash 11b; the flash taking the path offering the least resistance moves into cavities or pockets 10.

In applying the weld nut of this invention, cavities or indentations 10 become relief areas adapted to receive any excess metal or flash resulting from the welding operation. The metal of a poorly heated welding projection is able to flow into the adjacent pocket, or relief area under the clamping pressure of the welder, more readily than it can into the space between the support member 17 and the adjacent flat face of the nut. Because of this, "cocked" nuts or nuts that are not seated squarely to the sheet or plate-like support member 17, are also practically unknown.

The weld nut of this invention is such that the relief areas (indentations, pockets or cavities) are formed incident to the striking up of the welding projections from one face of an ordinary nut, preferably a nut of the stove type.

It is adapted to rapid automatic manufacture in a simple die wherein upsetting punches close inwardly on the upper edge portion of opposite sides or corners of the nut in such manner that metal is struck up ahead of such punches. Although this method of making the weld nut is by far the simplest, it is to be understood that weld nuts having welding projections and pockets, cavities or indentations, as herein disclosed, made by other methods are to be considered within the scope of this invention.

This application is a continuation-in-part of my co-pending application Serial No. 39,679, filed July 20, 1948, now abandoned.

As clearly shown in the drawings, the weld projections 11 of my nut construction have an outer side face (below the knife or straight edge 19) that is laterally-inwardly offset with respect to the side wall 15 and that defines a laterally-inwardly indented flash pocket 10 therewith. The flash pocket 10 is, as shown, vertically or outwardly open to the end face 12 of the nut that is to be welded to the support member 17. As will appear from Figure 1, each weld projection 11 which is outwardly disposed with respect to the end face 12 is of a tongue shape and has a lateral-outer welding face that slopes or declines towards the end face 12 from the outer side face and that defines the apex straight edge 19 with the side face.

Referring particularly to Figures 7 and 8, it will appear that the welding operation is initiated by the engagement of the straight edge 19 with the support member 17 and that it progresses from said straight edge laterally-inwardly along the welding projection 11, such that a progressively lessened amount of weld metal is melted down and made available as the welding operation continues, see also Figure 1.

What I claim is:

1. A weld nut of the character shown and described comprising, substantially vertical side walls having substantially vertical side ends, an upper substantially planar end portion to be welded on a support member, and a threaded bore extending centrally therethrough at substantially right angles with respect to the end portion, a plurality of said side walls being flat, a plurality of welding projections and flash pockets formed by displacement of portions of the material of the nut adjacent the intersections of said substantially planar end portion and said flat walls, said welding projections and flash pockets being formed in substantial symmetry about a plane which is perpendicular to one of said flat walls and includes the axis of said threaded bore, each said welding projection and flash pocket being spaced from the side ends of one of said flat walls and defined by a vertically-outer welding face sloping upwardly and outwardly from said planar end portion and terminating in an apex straight edge spaced above and inwardly of the adjacent flat wall and being substantially parallel to the adjacent one of said intersections, a substantially planar outer side face sloping downwardly and slightly inwardly from said apex straight edge, a recessed surface substantially perpendicular to said adjacent flat wall, said recessed surface extending downwardly from said substantially planar end portion and forming a boundary of the lower portion of said planar outer side face, and each said apex straight edge lying in a common plane parallel to said planar end portion and forming the uppermost portion of said nut.

2. A weld nut as defined in claim 1 wherein said nut has an even number of vertical side walls, each side wall has a parallel side wall opposite thereto, and a plurality of said flash pockets are formed symmetrically within at least one set of opposed side walls.

3. A weld nut as defined in claim 1 wherein said apex straight edge of each welding projection overhangs a flash pocket to provide for weld metal flow from the welding projection to such flash pocket.

References Cited in the file of this patent

UNITED STATES PATENTS

| | | |
|---|---|---|
| 355,112 | Wrenshall | Dec. 28, 1886 |
| 816,533 | Cramer | Mar. 27, 1906 |
| 1,224,720 | Di Salvo | May 1, 1917 |
| 1,795,570 | Nilson | Mar. 10, 1931 |
| 1,835,710 | Jenkins | Dec. 8, 1931 |
| 1,952,305 | Beck | Mar. 27, 1934 |
| 2,054,187 | Almdale | Sept. 13, 1936 |
| 2,073,467 | Demboski et al. | Mar. 9, 1937 |
| 2,123,843 | Cox | July 12, 1938 |
| 2,167,285 | Smith | July 25, 1939 |
| 2,179,398 | Briggs | Nov. 7, 1939 |
| 2,208,532 | Woodward | July 16, 1940 |
| 2,225,654 | Olson | Dec. 24, 1940 |
| 2,271,267 | Lehre | Jan. 27, 1942 |
| 2,327,556 | Purinton | Aug. 24, 1943 |
| 2,443,815 | Dahl | June 22, 1948 |
| 2,495,409 | Costello | Jan. 24, 1950 |
| 2,739,377 | Carlyle | Mar. 27, 1956 |
| 2,822,850 | McLaughlin | Feb. 11, 1958 |